Sept. 25, 1934.  A. L. KRONQUEST ET AL  1,975,011
MACHINE FOR TREATING FILLED CONTAINERS PREPARATORY TO SEALING THE SAME
Filed Nov. 18, 1932  7 Sheets-Sheet 3
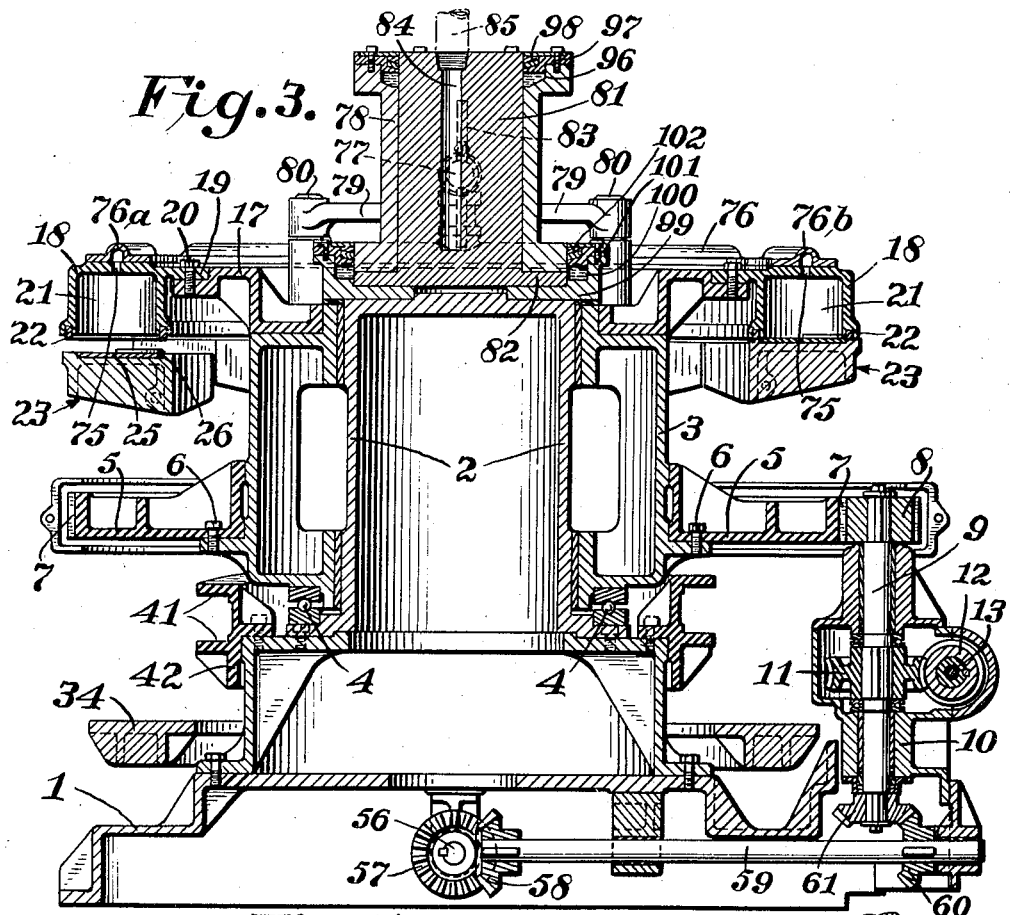
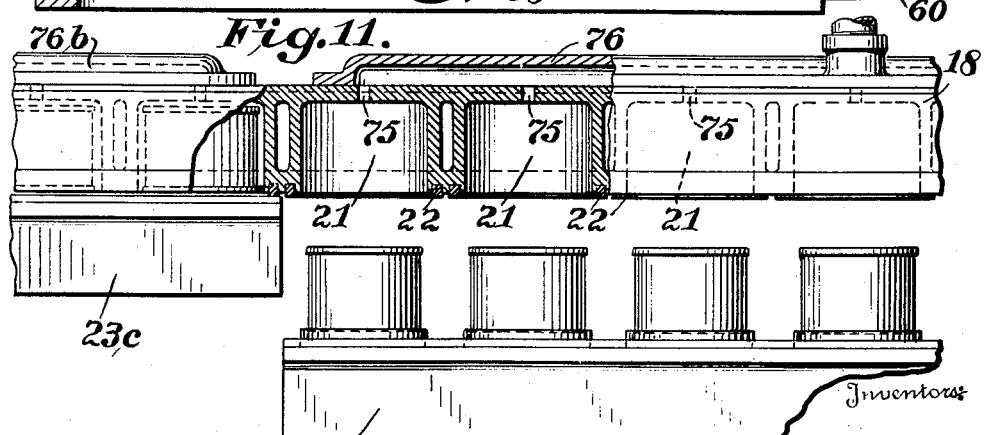
Inventors
Alfred L. Kronquest,
Ronald B. McKinnis,

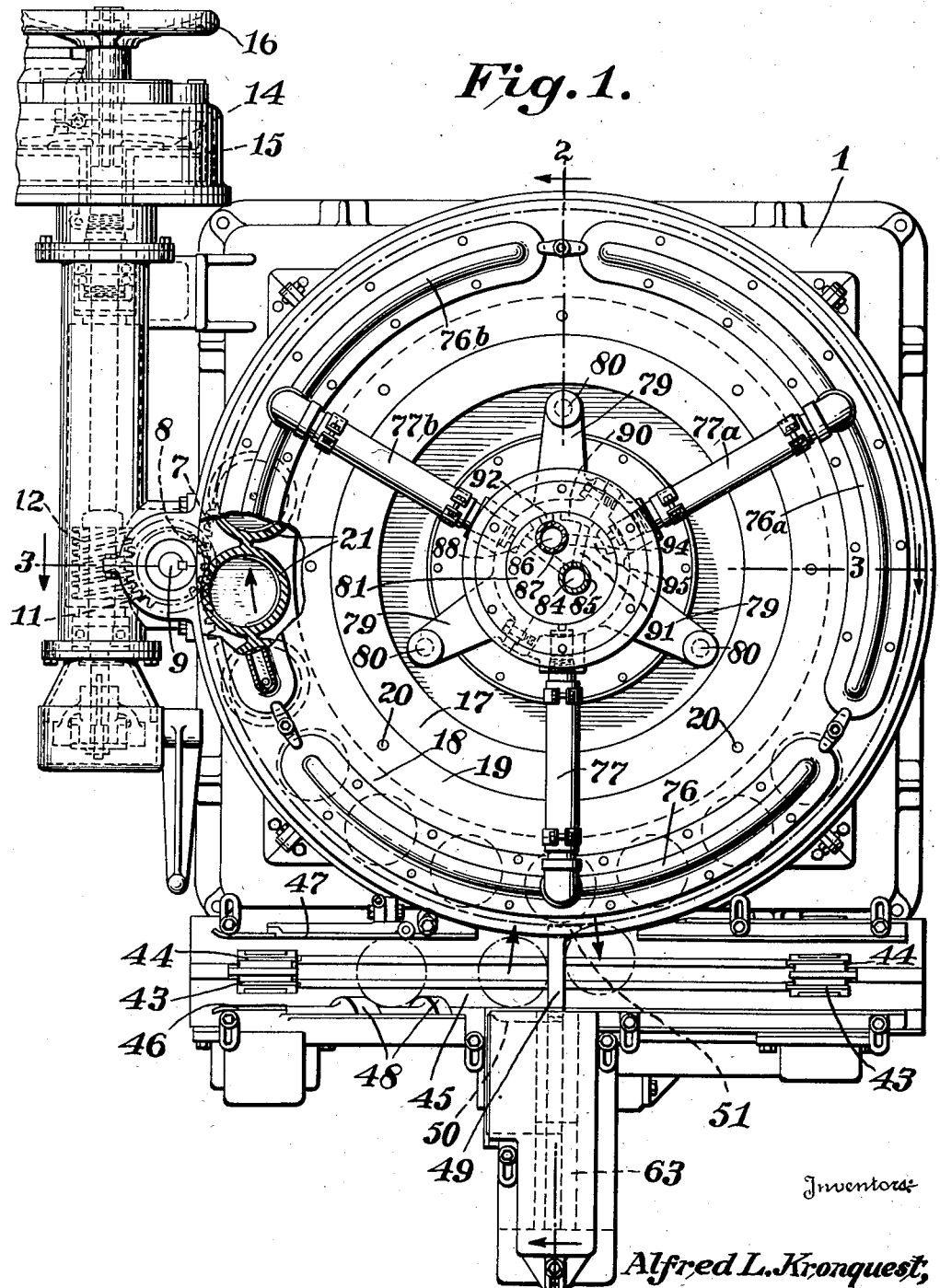

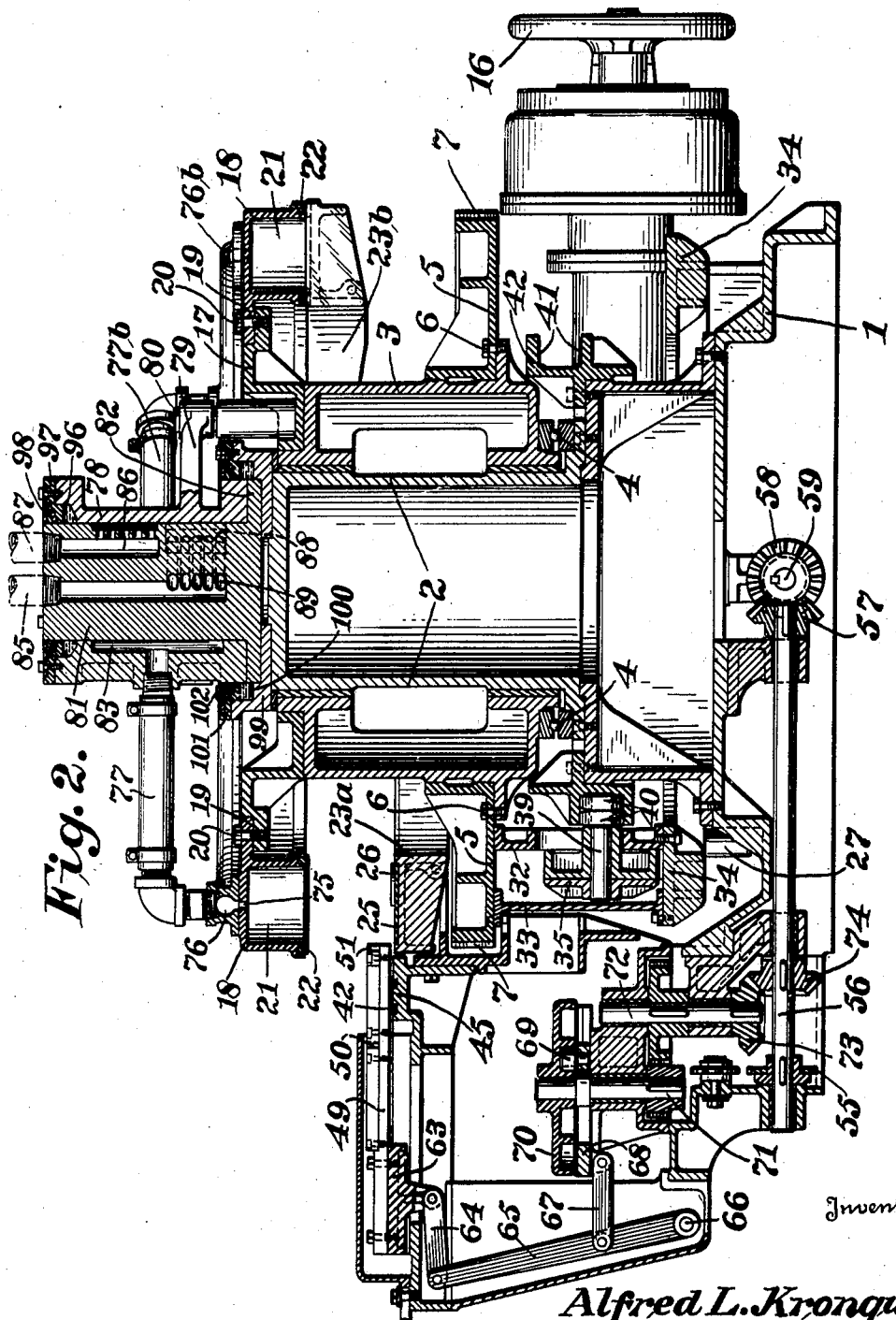

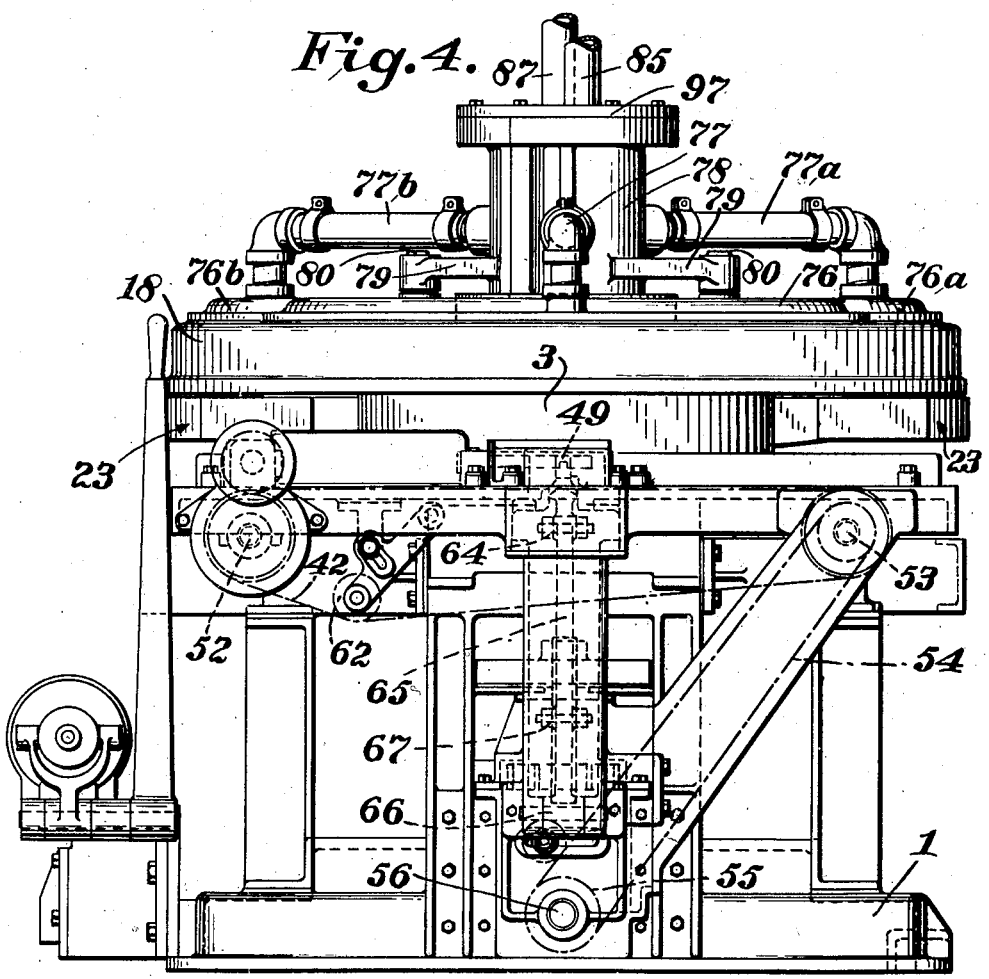
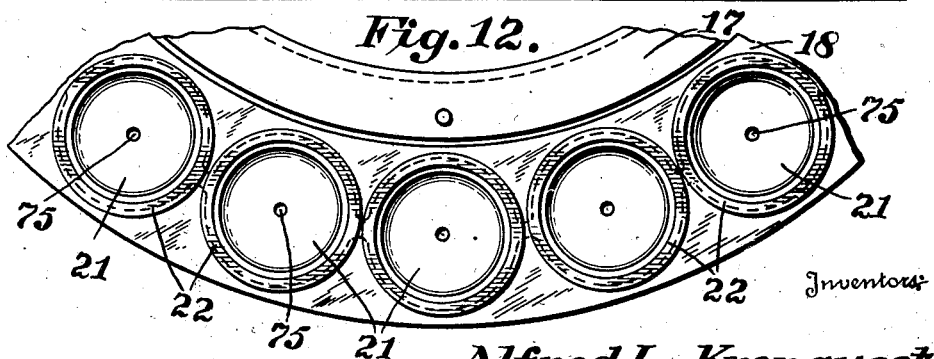

Inventors
Alfred L. Kronquest,
Ronald B. McKinnis,

Inventors
Alfred L. Kronquest,
Ronald B. McKinnis,
By Sturtevant, Mason & Porter
Attorneys.

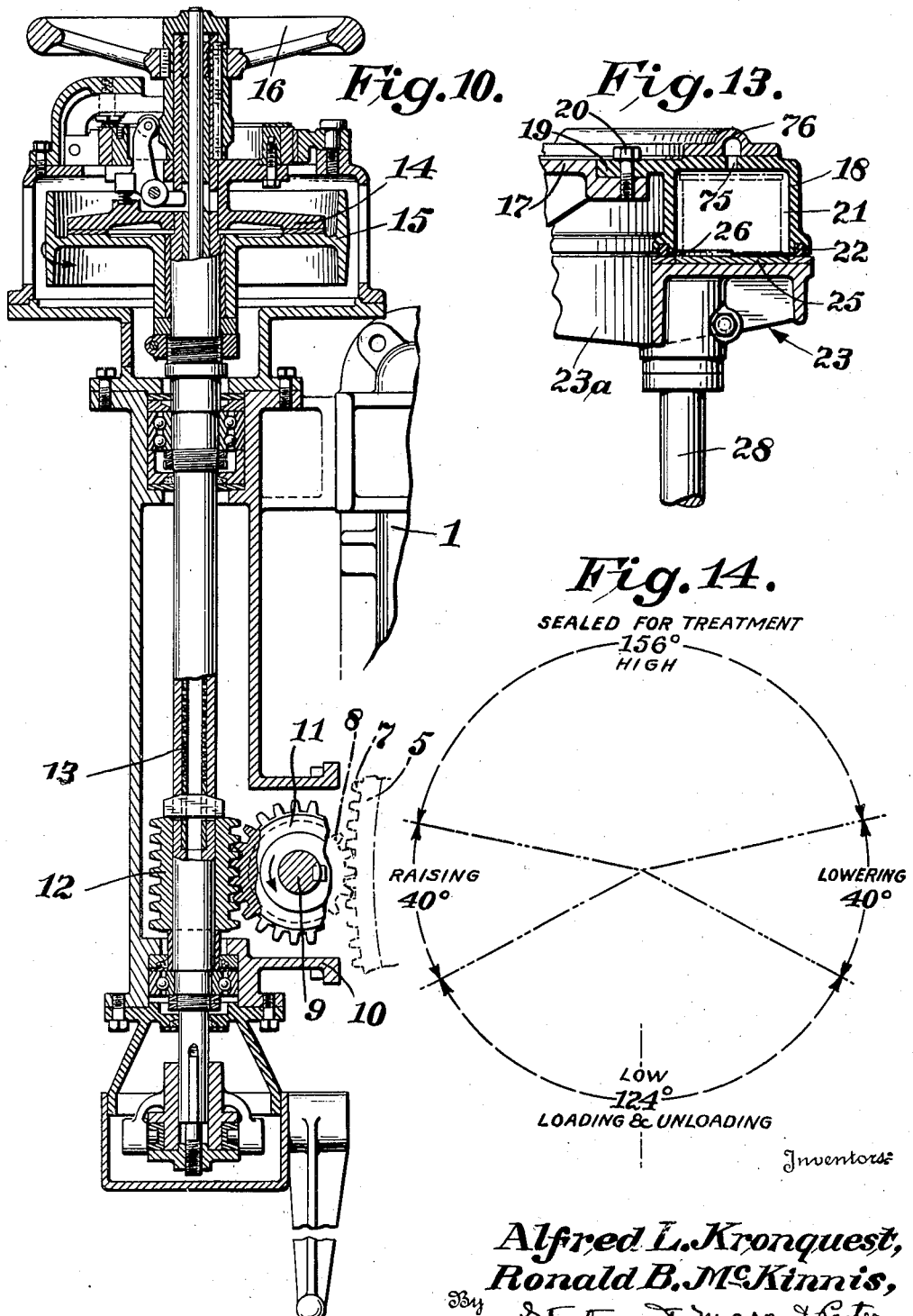

Patented Sept. 25, 1934

1,975,011

UNITED STATES PATENT OFFICE 1,975,011

MACHINE FOR TREATING FILLED CONTAINERS PREPARATORY TO SEALING THE SAME

Alfred L. Kronquest, Syracuse, N. Y., and Ronald B. McKinnis, Pittsburgh, Pa., assignors to Continental Can Company, Inc., New York, N. Y., a corporation of New York Application November 18, 1932, Serial No. 643,302

22 Claims. (Cl. 226—68)

The invention relates to new and useful improvements in a machine for treating filled containers preparatory to the sealing of the same.

An object of the invention is to provide a machine of the above type wherein a plurality of containers may be simultaneously placed in a closed chamber and treated, and wherein the machine may be supplied with containers one at a time from a continuously traveling line of containers.

A further object of the invention is to provide a machine of the above type wherein the chamber receiving the container is provided with a plurality of connected compartments conforming in shape to the container so that the containers in all of the compartments may be simultaneously subjected to treatment and the space to be treated reduced to a minimum.

A still further object of the invention is to provide a machine wherein a series of chambers adapted to enclose one or more containers are connected in succession to a vacuum creating means through a valve controlling mechanism which closes the connection to the vacuum creating means after one chamber is vacuumized before connection is made to another chamber.

A still further object of the invention is to provide a machine wherein a series of chambers adapted to enclose one or more containers are connected in succession to a vacuum creating means and a gassing means through a valve controlled mechanism which closes the connection to the vacuum creating means after one chamber is vacuumized before a connection is made to another chamber.

These and other objects will in part be obvious and will in part be hereinafter more fully described.

In the drawings which show by way of illustration one embodiment of the invention—

Figure 1 is a plan view of the complete machine with parts broken away and in section;

Fig. 2 is a longitudinal vertical sectional view on the line 2—2 of Fig. 1;

Fig. 3 is a transverse vertical sectional view on the line 3—3 of Fig. 1;

Fig. 4 is a side elevation of the machine;

Fig. 10 is an enlarged sectional plan view of the main driving mechanism for the machine;

Fig. 11 is an enlarged detail elevation showing the vacuum cup ring partly in section and table sectors with containers carried thereon;

Fig. 12 is a detail bottom plan of the vacuum cup ring;

Fig. 13 is an enlarged transverse sectional view through one of the vacuum cups, showing a table sector raised to seal a container (indicated in dot and dash lines) therein, and Fig. 14 is a diagram to show graphically the cycle of operations.

Figure 5:
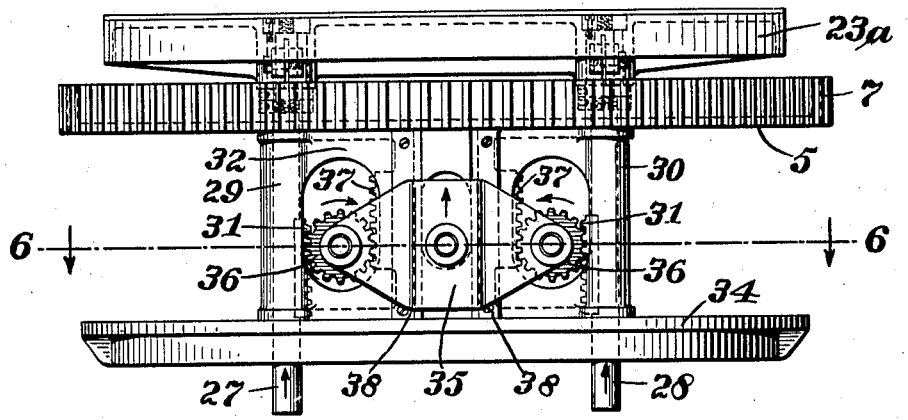
Fig. 5 is a detail elevation of one of the table sectors and the operating mechanism therefor.

The invention has to do with a machine for treating filled containers preparatory to the sealing of the same, and more particularly to a machine wherein the container, after it is filled, is subjected to a vacuum, which vacuum is replaced with a gas, and the container is sealed at atmospheric pressure. The illustrated embodiment of the invention includes a rotating casing or housing having a series of separated chambers, each of which consists of a plurality of compartments connected to a common manifold so that the containers in the separate compartments of a chamber may be simultaneously treated. These compartments, as shown, conform to the shape of the containers which are to be treated and are dimensioned so as to provide only a minimum clearance space for the insertion of the containers into the compartments. Associated with the casing or housing for the containers is a table including a series of sectors, one for each chamber. Each table sector is mounted so that it may be independently raised and lowered. The containers are placed one at a time on the sectors beneath the compartments as the sectors pass the feeding-in station. Each sector includes a means for centering a container beneath one of the compartments. The table sector, of course, moves with the compartments, and when a sector has the proper number of containers placed thereon and has reached a certain point in the cycle of rotation of the table, it is raised so as to place the containers in the compartments and close and seal the compartments and the chamber containing the said compartments. While the compartments are traveling, the chamber containing the same is connected to a vacuum creating means through a control valve. The vacuum creating means operates in succession on the chambers and the valve controlling mechanism is so constructed that one chamber is disconnected from the vacuum creating means before another is connected thereto. As shown in the drawings, the compartments after they have been vacuumized and disconnected from the vacuum creating means, are then connected to a gassing means which supplies a heavy inert gas to the compartments and the containers. The machine, as shown, also includes means whereby the container is subjected to a second vacuum treatment and a second gassing treatment, after which the table sector is lowered, removing the containers from the compartments, and they are taken one at a time from the traveling sector and discharged from the machine. The containers are preferably provided with covers which are loosely clinched thereto. The containers as they leave the machine are at once delivered to a closing machine where the cover or container end is seamed to the container body and the container thus hermetically closed.

Referring more in detail to the drawings, the machine includes a supporting base 1 carrying a vertically arranged column 2 which is fixed to the supporting base. Mounted for rotation around said column is a turret sleeve 3. Said turret sleeve is mounted on a ball bearing 4 of any desired construction. Attached to the turret sleeve 3 is a ring bracket 5 secured to the turret sleeve by bolts 6. This ring bracket 5 is provided with gear teeth 7 on its outer periphery, and a driving pinion 8 (see Figs. 1 and 3) meshes therewith and imparts rotation to the turret. The pinion 8 is fixed to the upper end of a shaft 9 which is mounted in a suitable bearing bracket 10 carried by the base of the machine. The shaft 9 is also provided with a worm gear 11 intermediate the ends thereof, which mesh with a worm gear 12 on a horizontal shaft 13 (see Figs. 3 and 10). This horizontal shaft 13 is driven through a clutch member 14 from a belt wheel 15. The shaft 13 may also be turned by a hand wheel 16. The specific means for rotating the turret forms no part of the present invention and may be of any suitable construction.

Mounted on this sleeve turret 3 and rotating therewith is a bracket 17. Attached to the bracket member 17 is a casing or housing 18 which is annular in shape and which is provided with an inwardly projecting flange 19 secured by bolts 20 to the bracket 17. This casing or housing 18 is provided with a series of separated chambers, three in number, as illustrated in the drawings. Each chamber has a series of compartments indicated at 21, and these compartments are shaped to conform to the container which is to be placed therein, and is preferably dimensioned so as to provide only a sufficient clearance to permit the container with the end loosely applied thereto to be readily inserted in a compartment and withdrawn therefrom. The casing or housing 18 is provided with a manifold 76 for each chamber, and this manifold is connected to each compartment, which are shown as separated, by a port 75. The manifold, the ports and the compartments, constitute the chamber, and it will be noted that the chamber in the compartments of which the containers are placed, is of very small dimensions so that a vacuum may be quickly drawn on the chamber and the containers therein, and so that the vacuum may be quickly replaced by a gas during the gassing of the chamber with the containers therein. The compartments open at the lower face of the casing or housing, and surrounding each compartment is a gasket 22. When it is desired to treat a container of different shape than cylindrical, or of different dimensions, the casing or housing may be quickly detached from the sleeve turret by removing the attaching bolts 20, and a casing or housing having compartments of different dimensions and shaping substituted therefor.

Figure 7:
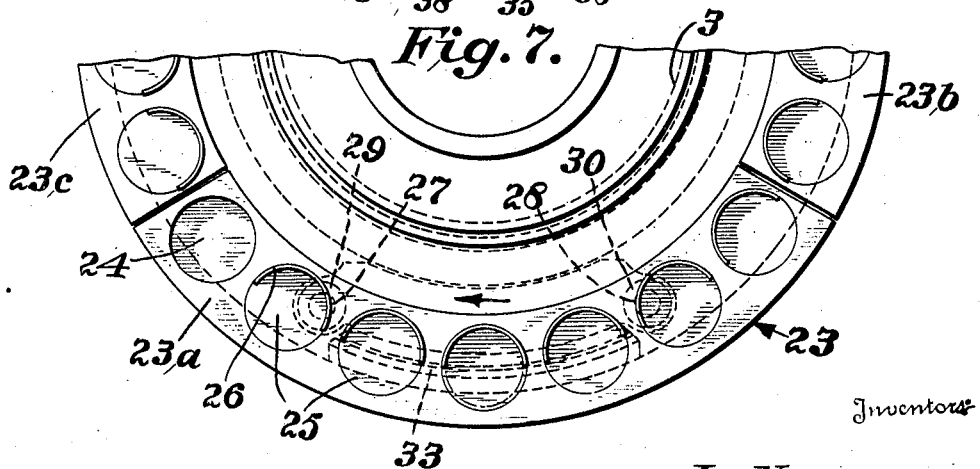
Fig. 7 is a fragmental plan view of the table sectors.

Carried by the sleeve turret 3 and for rotation therewith is a table 23. This table is provided with three separate sectors, each of which occupies substantially one hundred and twenty degrees of the circular extent of the table. In Fig. 7 of the drawings, one of the sectors is shown in full, and the ends of the two adjacent sectors. The sector shown in full is lettered 23$^a$, the sector at the right thereof as viewed in the figure, is lettered 23$^b$, and the one at the left is lettered 23$^c$. While the table rotates with the sleeve turret 3, means is provided so that each sector may be independently raised and lowered. When a sector has been loaded with containers to be placed in the compartments, it is raised as the turret travels, bringing the containers into their respective compartments and contacting with the gaskets at the lower face of each compartment. This seals the compartments with the containers therein. Each sector of the table is provided with circular recesses 24 adapted to receive hardened steel disks 25; and each disk is provided with a raised centering guide 26. The containers are moved on to the table and on to these disks, and the centering guides place or align the containers directly beneath the compartment. There is, of course, a centering disk in the table beneath each compartment. When these disks wear, they may be readily replaced, or when it is desired to center a container of a different diameter, then other disks are substituted therefor having a properly positioned guide for centering the container under the compartment.

Figure 6:
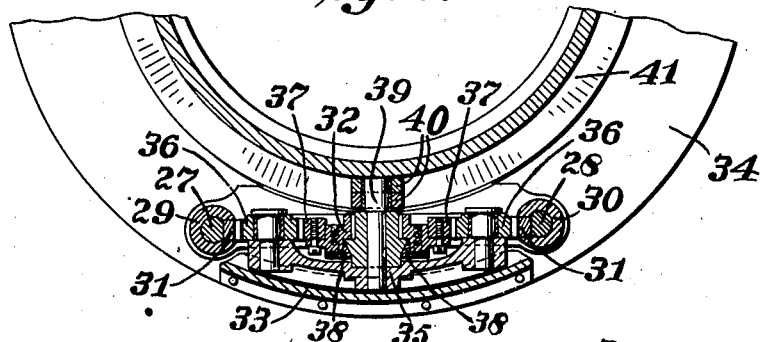
Fig. 6 is a sectional plan view on the line 6—6 of Fig. 5.

Each table sector is mounted on vertically disposed rods 27 and 28. These rods are adapted to slide in sleeves 29 and 30, respectively. The sleeves are open at their inner sides, and each rod is provided with a rack bar 31 which projects through the slotted side of the sleeve. These sleeves 29 and 30 are formed as a part of a bracket web 32 which is attached at its upper end to the ring bracket 5. There is also a depending bracket web or cover plate 33 carried by the ring member 5 and attached to the lower ends of these web bracket members 32 and 33 is a ring member 34. These parts all rotate with the sleeve turret 3, and this carries the table so that the table travels with the sleeve turret and at the same speed of movement of the casing or housing 18. The means for raising the table sector is shown more in detail in Figures 5 and 6. Mounted on the web bracket 32 is a crosshead 35 which slides freely vertically on the web bracket member 32. This crosshead carries pinions 36, 36 which mesh with the rack bars 31, 31 carried by the rods 29 and 30. The pinions 36 also mesh with stationary rack bars 37, 37 which are attached to the web bracket member 32. The crosshead is slidingly mounted on the web bracket member 32 by retaining plates 38, 38 (see Fig. 6). Fixed to the crosshead is a rod 39 on which a roller 40 is journaled. This roller runs in a cam groove 41 formed in the bracket member 42 which is clamped to the frame member of the machine. The cam is stationary, and the roller runs along the cam groove as the turret rotates, and will raise and lower the crosshead. When the crosshead moves upward, as indicated by the arrow in Fig. 5, this will cause the pinions 36 to move bodily upward, and as they mesh with the stationary rack bars 37, the pinions will be turned in the direction of the arrow as, indicated in Fig. 5. The turning and bodily travel of the pinions will cause the rack bars meshing therewith and the rods 27 and 28 attached thereto to move upward, thus lifting the table. The table moves twice as fast as the crosshead, so that by a very limited range of movement of the crosshead, the table can be lifted to a greater extent than the height of the container. This permits the initial positioning of the table a sufficient distance beneath the casing or housing containing the chambers, so that a container may be moved on to the table and underneath the housing or casing. The cam groove 41 is so shaped that after a plurality of containers have been placed on the table sector, the sector is raised simultaneously inserting all of the containers carried thereby in the compartments of the chamber associated therewith. It is understood that there is a crosshead and a mechanism similar to that described above associated with each table sector, and the table sectors will be lifted and lowered one after another as the sleeve turret rotates.

The containers are fed one at a time on to the table as it rotates and placed in the centering means thereon. As shown in Fig. 1 of the drawings, the containers are moved along a runway in a continuous line and are delivered to a pair of traveling belts, one of which is indicated diagrammatically at 42 (Fig. 4). These traveling belts run over operating wheels 43 and 44 and travel in grooves in a supporting table 45 so as to move the containers along the table. There are guide rails 46 and 47 between which the containers pass, and a timing screw 48 which spaces the containers and places the containers one after another at the feeding-in station.

The containers are fed from the traveling belts on to the traveling table by the feed finger 49. Said feed finger has an arm 50 projecting to the left thereof as viewed in Fig. 1. The container will be brought into contact with the feed finger by the conveyor belt and when the feed finger is moved inwardly, it will carry the container from the conveyor belts on to the table. The finger 49 also has an arm 51 projecting to the right and is timed so as to stop at the forward end of its stroke for a brief period. The table rotates in a clockwise direction as viewed in Fig. 1, and this will carry the container placed on the table away from the feed finger 49. It will also bring a container which has been vacuumized and gassed and resting on the table against the right-hand side of the feed finger 49 and in front of the arm 51 so that on the retracting of the feed finger, the container that has been gassed will be removed from the table and placed on to the traveling conveyor belts. The belts will then take up the movement of the container in a right line, and they are thus conveyed to a closing machine where the end may be secured to the container. The outer face of the arm 51 is tapered, and this will force the container out of the centering guide before the container comes into contact with the face of the feed finger 49.

The conveyor belts run over driving pulleys carried by shafts 52 and 53, respectively. On the shaft 52 is a gear wheel which operates the timing screw 48. On the shaft 53 is a driving sprocket which is operated by a sprocket chain 54 from a sprocket 55 on the shaft 56. The shaft 56 carries a bevel gear 57 meshing with a bevel gear 58 on a shaft 59 (see Fig. 2). The shaft 59 carries a bevel gear 60 which meshes with a bevel gear 61 at the lower end of the shaft 9 (see Fig. 3). Thus it is that the conveyor belts are continuously driven from the operating shaft of the machine. There is a belt tightener 62 (see Fig. 4) for the conveyor belts.

The feed finger 49 is mounted for reciprocation on a carrier 63. Said carrier has a depending lug to which a link 64 is attached. The link 64 is pivoted to an arm 65 pivoted at 66 to the frame of the machine. The arm 65 is pivoted through link 67, to a slide 68. The slide 68 moves in a suitable guideway and movement is imparted thereto by a roller 69 cooperating with a cam 70 mounted on a shaft 71. The shaft 71 is connected through suitable gears to a shaft 72, and the shaft 72 carries a bevel gear 73 meshing with a bevel gear 74 on the shaft 56. The groove in the cam 70 is shaped so as to give proper reciprocations to the feed finger 49 for placing the containers one at a time on to the traveling table, and it also receives the containers one at a time from the traveling table after they have been treated.

Figure 8:
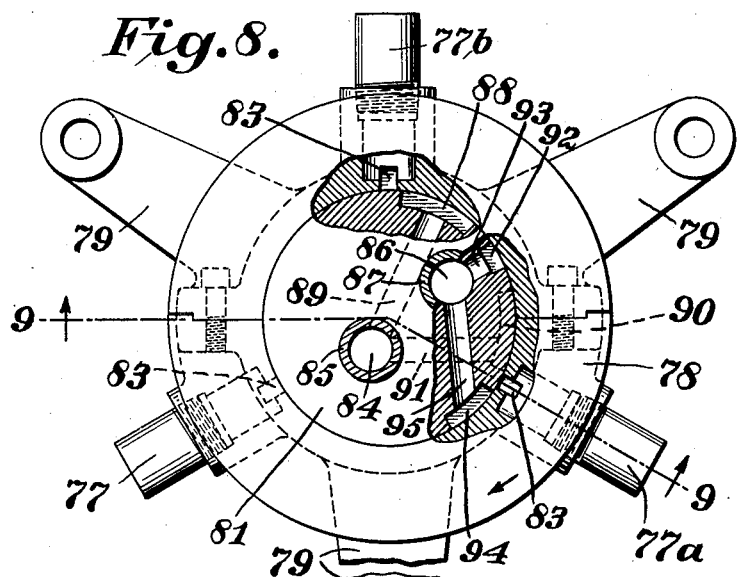
Fig. 8 is an enlarged plan view of the control valve mechanism for the vacuum and gassing operations, partly broken away and in section.
Figure 9:
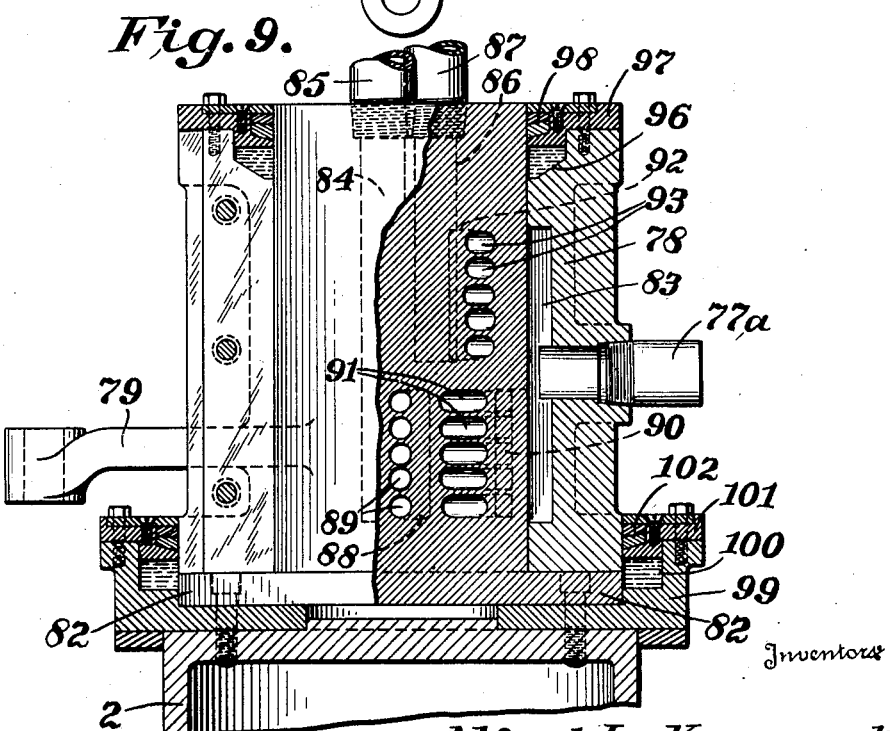
Fig. 9 is a vertical sectional view on the line 9—9 of Fig. 8, with parts in elevation, and showing the valve mechanism mounted in the central standard of the machine.

The means for subjecting the chambers containing the containers to a vacuum, and the replacing of the vacuum with a gas will now be described. Each chamber, as described above, is provided with compartments to receive the containers. These compartments are side by side and extend substantially throughout the length of a table sector. As has already been described, the casing 18 is provided with a manifold 76 extending over all of the compartments of one table sector, and there is a port 75 connecting each compartment with the manifold. The manifold, the ports and the compartments constitute a chamber. The manifold 76 has a pipe 77 attached thereto. The manifold 76$^a$ has a pipe 77$^a$ attached thereto. The manifold 76$^b$ has a pipe 77$^b$ attached thereto. These pipes 77, 77$^a$ and 77$^b$ have a threaded connection with the valve sleeve 78. The valve sleeve 78 is provided with projecting arms 79 and each arm is connected to a pin 80 which is attached to the bracket 17 supporting the housing or casing 18, and the ring valve is thus caused to rotate in timing with the rotation of the sleeve turret and the parts associated therewith. Located within this sleeve valve is a valve stem 81 which is provided with a flange 82 at its lower end, and the valve stem is secured to the column 2 so that it is stationary and does not rotate. The valve ring, as clearly shown in Fig. 8, is formed in two sections, so that it may be readily worked upon to bring about a very tight running fit with the valve stem 81. The valve ring on the inner face thereof has a vertically extending recess 83. This recess is relatively narrow and serves as a means for communicating with the pipes. There is a recess associated with each pipe connection. The valve stem is provided with a passage extending vertically thereof and indicated at 84, to which a pipe 85 connected with a suitable vacuum creating means is attached. The valve stem also has a vertically extending passage 86 which is connected to a pipe 87 that is in turn attached to a gas supplying apparatus. In the outer face of the valve stem there is a recess 88 which is connected by a series of ports 89 with the passage 84. The valve stem also has a vertical recess 90 shown in broken lines in Fig. 8, which is connected by means of ports 91 with the passage 84. The valve stem has a vertically extending recess 92 which is connected by ports 93 with the passage 86. The valve stem has a second vertically extending recess 94 which is connected by a series of ports 95 with the passage 86. When the pipe 85 is subjected to a vacuum from the vacuum creating apparatus, it will create a vacuum in the recesses 88 and 90, and when the pipe 87 is supplied with gas, the gas will be conveyed to the recesses 92 and 94.

As the valve ring rotates, the recess 83 associated with one of the pipes leading to a manifold will pass in succession these recesses 88, 92, 90 and 94. When the recess 83 makes connection with the recess 88, the manifold associated with the pipe 77 will be placed under vacuum. The valve is so timed with the movement of the table sector that the manifold is not placed under vacuum until the table sector has closed and sealed the compartments and the chamber containing the same. When the recess 83 is moving across the recess 88, a vacuum will be drawn on the chamber and the containers therein. The covers are preferably placed on the containers and secured thereto by light clinching, so that when the chamber is placed under vacuum, the air and gases will be drawn from the container through the loose connection between the cover or can end and the body of the container. The recess 83 associated with the pipe 77ᵇ will then pass across the intervening portion of the stem between the recesses 88 and 92, and this is of sufficient width so as to prevent any cross connection between the recess having a vacuum thereon and the recess supplied with a gas. While the recess and the pipe 77ᵇ associated therewith are passing over the recess 92, gas is supplied to the manifold and forced into the chamber and container, filling the container. This completes the first cycle of vacuumizing and gassing the container. In the embodied illustration of the invention, the valve is designed for a two-cycle vacuum and gassing operation. This occurs when the recess 83 crosses the recesses 90 and 94 in succession, in the manner which has been described above.

In order to seal the connection between the valve ring and the valve stem, the valve ring is provided with a countersink or recess 96. The recess 96 is supplied with oil, and is closed by a flanged plate 97 carrying a felt washer 98 which keeps the dust and dirt out of the oil. The valve stem is secured to a plate 99 which has an upstanding portion providing a recess 100 which is supplied with oil, and which operates to seal the joint between the valve ring and the flange of the valve stem. A flanged plate 101 carrying a felt pad 102 covers the oil well and keeps dust and dirt out of the oil.

It is thought that the operation of the machine will be obvious from the description which has been given. The containers are filled with the product which is to be sealed therein, and the covers or closing ends are preferably lightly clinched to the container body. The filled containers are fed along a runway one at a time, and when the filled containers reach the feeding-in station, a container is moved from the line on to the table sector. One by one the containers are placed on the table which is continuously rotating. At this time the table sector is at its lowest position. After the table sector has been provided with containers, one for each compartment, then the table sector is raised through a roller on the crosshead associated with the table sector, being moved upward by the action of the cam groove 41 thereon. This will lift the table sector so as to place the containers simultaneously in their respective compartments and will close and seal all of the compartments and the chamber containing the same. The table sector is raised while traveling through approximately forty degrees of travel. It is loaded while traveling through approximately one hundred and twenty-four degrees. After the chamber is closed, it will be subjected first to vacuum through the turning of the valve ring so as to bring the recess 83 into register with the recess 88. As the sleeve turret continues its rotation, the vacuum drawn on the containers is replaced with gas, which is preferably a heavy inert gas, such as carbon dioxide, although any other gassing treatment may be followed. In the present machine, as the table continues its movement, the gassed container will be again subjected to vacuum, and the vacuum thus placed on the container will be replaced by a second gas treatment. This concludes the gassing of the containers, and it will be noted that all of the containers on the table sector are simultaneously placed under vacuum and the vacuum is replaced simultaneously on all vacuumized containers by a gas. Inasmuch as a plurality of containers are subjected to vacuum simultaneously, the time interval for efficiently vacuumizing the container at a given speed of travel of the casing is considerably less than where the containers are vacuumized one at a time. The same is true in connection with the supplying of the gas. The chambers into which the containers are placed for treatment are, as stated above, shaped so as to conform to the container with a maximum clearance to permit the easy insertion and removal of the container. This reduces to a minimum the extent of the chamber which is to be vacuumized, and greatly facilitates the quick and efficient creation of a vacuum within the container. It also greatly facilitates the supplying of the containers with gas, and with as little use of the gas as possible. In the machine as described above, a very efficient vacuumization of the containers may be obtained due to the fact that the chamber in which the container is vacuumized is closed, and then the chamber is connected to the vacuum creating means, and during the entire drawing of the vacuum on the chamber it is completely closed, except for its connection to the vacuum creating means. This permits the drawing of a vacuum to the full capacity of the vacuum creating means. After the vacuumizing of the chamber has been completed to the desired extent, then the connection to the vacuum creating means is closed before it is again connected to another chamber for creating a vacuum thereon. The same is true as to the supplying of gas to the chambers; the valve closes the connection between the chamber and the vacuum creating means before the chamber is connected to the gassing means, and the chamber is likewise closed to the gassing means before it is again connected to the vacuum creating means. This reduces to a minimum the volume of air or of gas which must be drawn from a chamber by the vacuum creating means and permits the highest efficiency to be obtained with a given vacuum creating apparatus. After the containers are removed from the machine, they are delivered to a closing machine for the hermetically securing of the container end to the container. When a heavy inert gas is used, very little will escape from the container before the end is attached thereto. The machine is capable of vacuumizing and gassing containers very rapidly, and a very short interval of time elapses between the treatment of the container and the closing of the same.

It is obvious that the number of individual compartments in the chamber associated with each table sector may be increased or decreased from that shown and described, and that changes may be made in the details of construction and the arrangement of the parts without departing from the spirit of the invention as set forth in the appended claims.

Having thus described the invention, what we claim as new and desire to secure by Letters Patent, is—

1. In a machine for treating filled containers preparatory to the sealing of the same, the combination of means for simultaneously subjecting a plurality of containers to a vacuum and for replacing the vacuum with an inert gas and then releasing said containers for sealing at atmospheric pressure, said means including a chamber having compartments conforming to the shape of the container with only sufficient clearance to permit the easy insertion of the containers in the compartments.

2. In a machine for treating filled containers preparatory to the sealing of the same, the combination of means for simultaneously subjecting a plurality of containers to a vacuum and for replacing the vacuum with an inert gas and then releasing said containers for sealing at atmospheric pressure, said means including a chamber having compartments conforming to the shape of the container with only sufficient clearance to permit the easy insertion of the containers in the compartments, and means for feeding containers one at a time to and from the vacuum creating and gassing means.

3. The combination of a casing having a plurality of chambers, each chamber having compartments conforming in shape to a cylindrical container and adapted to house said container for treatment, means for simultaneously placing a plurality of containers in the respective compartments of a chamber and sealing said chamber, and means for creating in said sealed chamber a vacuum and for replacing the vacuum with an inert gas.

4. The combination of a casing having a plurality of chambers, each chamber having compartments conforming in shape to a cylindrical container and adapted to house said container for treatment, means for simultaneously placing a plurality of containers in the respective compartments of a chamber and sealing said chamber, means for creating in said sealed chamber a vacuum and for replacing the vacuum with an inert gas, and means for feeding the containers one at a time into position for placement in the compartments.

5. The combination of a casing having a plurality of chambers, each chamber having compartments conforming in shape to a cylindrical container and adapted to house said container for treatment, means for simultaneously placing a plurality of containers in the respective compartments of a chamber and sealing said chamber, means for creating in said sealed chamber a vacuum and for replacing the vacuum with an inert gas, means for rotating said casing, and means for feeding the containers one at a time into position for placement in the compartments.

6. The combination of a rotated turret, an annular casing carried thereby and having a plurality of separate chambers, each chamber having compartments conforming in shape to the containers to be placed therein, a table beneath said casing including table sectors extending beneath a plurality of compartments, means for placing containers on the table sectors while the turret is rotating, means for raising said sectors in succession for placing the containers thereon in the respective compartments and for closing and sealing the chamber containing the closed compartments, and means for creating a vacuum in the closed chamber and for replacing the vacuum with an inert gas.

7. The combination of a rotated turret, an annular casing carried thereby and having a plurality of separate chambers, each chamber having compartments conforming in shape to the containers to be placed therein, a table beneath said casing including table sectors extending beneath a plurality of compartments, means for placing containers on the table sectors while the turret is rotating, means for raising said sectors in succession for placing the containers thereon in the respective compartments and for closing and sealing the chamber containing the closed compartments, means for creating a vacuum in the closed chamber and for replacing the vacuum with an inert gas, said raising means for the table sector operating to lower the same after the containers have been gassed, and means for removing the containers from the table while it is rotating.

8. The combination of a rotated turret, an annular casing carried thereby and having a plurality of separate chambers, each chamber having compartments conforming in shape to the containers to be placed therein, a table beneath said casing including table sectors extending beneath a plurality of compartments, a centering device on the table beneath each compartment, means for feeding containers one at a time on to the table while it is rotating, and into contact with said centering device, means for raising a table sector after it has been loaded with containers for placing the containers in the respective compartments and for closing and sealing the same, and means for creating within the chamber containing the closed compartments a vacuum, and for replacing the vacuum with a gas.

9. The combination of a rotated turret, an annular casing carried thereby having a plurality of separate chambers, each chamber having compartments placed side by side and opening downwardly, said casing having a gasket surrounding the opening to each compartment, said compartments being shaped to conform to the containers placed therein for treatment, a table located beneath the casing and rotating therewith, said table having a plurality of sectors, each extending under a plurality of compartments, said table having a container centering device beneath each compartment, means for placing containers one at a time against the centering devices while the table is rotating, means for raising a table sector for placing the containers in their respective compartments and for closing and sealing the compartments, and means for creating in each chamber containing the closed compartments a vacuum and for replacing the vacuum with an inert gas.

10. The combination of a rotated turret, an annular casing carried thereby having a plurality of separate chambers, each chamber having compartments placed side by side and opening downwardly, said casing having a gasket surrounding the opening to each compartment, said compartments being shaped to conform to the containers placed therein for treatment, a table located beneath the casing and rotating therewith, said table having a plurality of sectors, each extending under a plurality of compartments, said table having a container centering device beneath each compartment, means for placing containers one at a time against the centering device while the table is rotating, means for raising a table sector for placing the containers in their respective compartments and for closing and sealing the compartments, each chamber having a manifold extending over the compartments above a table sector, and ports leading from the manifold to the separate compartments, and pipes leading from said manifold to a central control valve whereby a vacuum may be created in the sealed compartments and replaced by an inert gas.

11. The combination of a casing having a plurality of chambers, each chamber having compartments conforming in shape to the container which is to be placed therein for treatment, means for rotating said casing, means for simultaneously placing containers in a plurality of compartments and sealing said compartments, each chamber having a manifold connecting the compartments, a central valve, a pipe leading from the manifold to said central valve, pipes leading from said valve, respectively, to a vacuum creating means and a gassing means, said valve being constructed whereby a vacuum is created within a chamber and the chamber closed to the vacuum creating means before another chamber is connected to said vacuum creating means.

12. The combination of a casing having a plurality of chambers, each chamber having a plurality of compartments conforming in shape to the container which is to be placed therein for treatment, means for rotating said casing, means for simultaneously placing containers in the compartments of a chamber and sealing said chamber, each chamber having a manifold connecting the compartments, a central valve, a pipe leading from the manifold to said central valve, pipes leading from said valve, respectively, to a vacuum creating means and a gassing means, said valve being constructed whereby a vacuum is created within a chamber and replaced with an inert gas, said valve also having means whereby the chamber is again placed under vacuum and the vacuum replaced with a gas.

13. A machine for treating filled containers preparatory to sealing the same including a rotatable casing having separate chambers, each chamber having a plurality of compartments therein each compartment opening downwardly and conforming to a container which is to be placed therein for treatment with only sufficient clearance to permit the easy insertion of the container, a support for the containers beneath said casing on which the containers are placed, means for centering the containers placed on the support beneath the compartments, means for raising and lowering the support whereby the containers are placed in the compartments and said compartments closed and sealed, a central valve, a manifold attached to the casing and overlying a plurality of compartments and connected thereto and forming therewith one of said chambers, a pipe leading from thh manifold to said central valve, said central valve including a rotating valve ring to which said pipe is attached, and a valve stem having separate passages therein connected, respectively, to a vacuum creating means and a gassing means, said valve stem and valve ring having recesses and ports formed therein whereby the chambers are connected in succession to the vacuum creating means and then disconnected therefrom and connected to the gassing means.

14. A machine for treating filled containers preparatory to sealing the same including a rotatable casing having separate chambers, each chamber having a plurality of compartments therein each compartment opening downwardly and conforming to a container which is to be placed therein for treatment with only sufficient clearance to permit the easy insertion of the container, a support for the container beneath said casing on which the containers are placed, means for centering the containers placed on the support beneath the compartments, means for raising and lowering the support whereby the containers are placed in the compartments and the compartments closed and sealed, a central valve, a manifold attached to the casing and overlying a plurality of compartments and connected thereto and forming therewith one of said chambers, a pipe leading from the manifold to said central valve, said central valve including a rotating valve ring to which said pipe is attached, a valve stem having separate passages therein adapted to be connected, respectively, to a vacuum creating and a gassing means, said valve stem and valve ring having recesses and ports formed therein whereby the chambers are connected in succession to the passages for connection to the vacuum creating means and then disconnected therefrom and connected to the passages for connection to the gassing means, and means for maintaining an oil seal between the valve stem and the valve ring.

15. In a machine for treating filled containers preparatory to the sealing of the same, the combination of traveling chambers, each having compartments conforming to the shape of the container with only sufficient clearance to permit the easy insertion of the containers in the compartments, means for placing containers in the respective compartments of each chamber and for subsequently sealing the chamber, said placing and sealing means operating in succession on said chambers, a rotating valve ring connected with the traveling chambers, a stationary valve stem extending through said ring and having passages adapted to be connected with a vacuum creating means and a gassing means, respectively, said valve stem and valve ring having cooperating recesses and ports whereby the chambers are connected in succession to a vacuum creating means and a gassing means.

16. A machine for treating filled containers preparatory to the sealing of the same, the combination of traveling chambers, each having compartments conforming to the shape of the container with only sufficient clearance to permit the easy insertion of the containers in the compartments, means for placing containers in the respective compartments of each chamber and for subsequently sealing the chamber, said placing and sealing means operating in succession on said chambers, a rotating valve ring connected with the traveling chambers, a stationary valve stem extending through said ring and having passages connected with a vacuum creating means and a gassing means, respectively, said valve stem and valve ring having cooperating recesses and ports whereby the chambers are adapted to be connected in succession to a vacuum creating means and a gassing means, said valve stem and said valve ring having additional recesses and ports whereby the chambers are a second time connected to a vacuum creating means and a gassing means.

17. In a machine for treating filled containers preparatory to the sealing of the same, the combination of traveling chambers, each having compartments conforming to the shape of the container with only sufficient clearance to permit the easy insertion of the containers in the compartments, means for placing containers in the respective compartments of each chamber and for subsequently sealing the chamber, said placing and sealing means operating in succession on said chambers, a rotating valve ring connected with the traveling chambers, a stationary valve stem having passages adapted to be connected with a vacuum creating means and a gassing means, respectively, said valve stem and valve ring having cooperating recesses and ports whereby the chambers are connected in succession to a vacuum creating means and a gassing means, and means for providing an oil seal between the valve stem and the valve ring.

18. In a machine for treating filled containers preparatory to the sealing of the same, the combination of traveling chambers, each having compartments conforming to the shape of the container with only sufficient clearance to permit the easy insertion of the containers in the compartments, means for placing containers in the respective compartments of each chamber and for subsequently sealing the chamber, said placing and sealing means operating in succession on said chambers, a rotating valve ring connected with the traveling chambers, a stationary valve stem having passages adapted to be connected with a vacuum creating means and a gassing means, respectively, said valve stem and valve ring having cooperating recesses and ports whereby the chambers are connected in succession to a vacuum creating means and a gassing means, said valve stem and said valve ring having additional recesses and ports whereby the chambers are a second time connected to a vacuum creating means and a gassing means, and means for providing an oil seal between the valve stem and the valve ring.

19. In a machine for treating filled containers, a traveling casing formed in sections, each section having a chamber provided with compartments adapted to receive a container, means operating in succession on each section of the casing for placing containers in the compartments thereof and sealing the said compartments and for removing the containers after they have been treated, and means for subjecting the containers to a vacuum while sealed in said compartments.

20. In a machine for treating filled containers, a traveling casing formed in sections, each section having a chamber provided with compartments adapted to receive a container, means operating in succession on each section of the casing for placing containers in the compartments thereof and sealing the said compartments and for removing the containers after they have been treated, and means operating in succession and independently on each section for placing the containers therein under vacuum.

21. In a machine for treating filled containers, a traveling casing formed in sections, each section having a chamber provided with compartments adapted to receive containers, means operating in succession on each section of the casing for placing containers in the compartments thereof and sealing the said compartments and for removing the containers after they have been treated, and means for subjecting said containers to a vacuum while sealed in said compartments and replacing the vacuum with an inert gas, said last named means operating in succession and independently on each section for placing the containers therein under vacuum.

22. In a machine for treating filled containers, the combination of a support onto which the containers are fed at regular intervals, a casing above said support and having a plurality of separated chambers for receiving containers, each chamber having compartments conforming to the shape of the container with only sufficient clearance to permit the easy insertion of the containers in the compartments, means for simultaneously placing containers in the respective compartments in a chamber and sealing the said chamber and for simultaneously withdrawing said containers from the chamber after they have been treated, and means for simultaneously subjecting the containers in a sealed chamber to a vacuum and for replacing the same with an inert gas.

ALFRED L. KRONQUEST.
RONALD B. McKINNIS.